United States Patent
Hofman

(10) Patent No.: US 6,549,293 B2
(45) Date of Patent: Apr. 15, 2003

(54) APPARATUS FOR PROCESS FOR MEASURING THE THICKNESS AND OUT-OF-ROUNDNESS OF ELONGATE WORKPIECES

(75) Inventor: Karsten Hofman, Bleckede (DE)

(73) Assignee: Lap GmbH Laser Applikationen, Luneburg (DE)

( * ) Notice: Subject to any disclaimer, the term of this patent is extended or adjusted under 35 U.S.C. 154(b) by 38 days.

(21) Appl. No.: 09/846,930

(22) Filed: May 1, 2001

(65) Prior Publication Data

US 2001/0040683 A1 Nov. 15, 2001

(30) Foreign Application Priority Data

May 11, 2000 (DE) .......................................... 100 23 172

(51) Int. Cl.⁷ .......................... G01B 11/24; G01B 11/06; G01B 11/02
(52) U.S. Cl. ........................ 356/635; 356/602; 356/608; 356/631
(58) Field of Search ................................ 356/635, 602, 356/630, 631, 611, 608

(56) References Cited

U.S. PATENT DOCUMENTS

| | | | | |
|---|---|---|---|---|
| 4,226,536 A | * | 10/1980 | Dreyfus et al. | 356/602 |
| 5,289,261 A | * | 2/1994 | Yogo et al. | 356/611 |
| 5,774,220 A | * | 6/1998 | Wienecke | 356/608 |
| 5,815,274 A | * | 9/1998 | Dlugos | 356/634 |
| 5,930,734 A | * | 7/1999 | Hofmann et al. | 702/97 |

FOREIGN PATENT DOCUMENTS

| | | | |
|---|---|---|---|
| DE | 40 37 383 | 5/1992 | |
| DE | 198 03 938 | 8/1998 | |
| EP | 0 843 156 | 10/1997 | |
| GB | WO-8102927 A1 * | 10/1981 | ........... G01B/11/24 |
| WO | 81/02927 | 10/1981 | |

OTHER PUBLICATIONS

Beruhrungslos Laser–Durchmesser–Messung (Steel & Metals Magazine), vol. 26, No. 10, 1988.

* cited by examiner

Primary Examiner—Georgia Epps
Assistant Examiner—Gary O'Neill
(74) Attorney, Agent, or Firm—Vidas, Arrett & Steinkraus, P.A.

(57) ABSTRACT

The invention relates to an apparatus and process for measuring the diameter and out-of-roundness of elongate workpieces, particularly those of round products advanced in their longitudinal direction in rolling mill trains. A reliable discrimination of orbiform-curved contours is required in measuring such workpieces. In an aspect of the invention, an apparatus is suggested with three or more laser triangulation devices, which measure the distance from the workpiece surface wherein the lasers of the triangulation device are directed to a common point of intersection which corresponds to the workpiece center and the laser beams of which span a common plane which is perpendicular to the longitudinal direction of the workpiece, and which are at angular distances which are substantially equal.

9 Claims, 5 Drawing Sheets

APPARATUS FOR PROCESS FOR MEASURING THE THICKNESS AND OUT-OF-ROUNDNESS OF ELONGATE WORKPIECES

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to an apparatus for measuring the diameter and out-of-roundness of elongate workpieces, particularly those of round products advanced in their longitudinal direction in rolling mill trains, and processes for measuring the diameter and out-of-roundness of such workpieces.

It is known to perform the adjustment of the roll nip for flat products (heavy plates, hot-rolled hoops) in rolling mills via a closed regulation system. To this end, the last roll stand has arranged behind it a measuring system which continuously measures the thickness and, if necessary, the planarity of the rolled product and, thus, provides the actual value for the regulation system, which will then adjust the height of the roll nip and the geometry of the roll nip via appropriate actors with a view to maintaining the dimensional accuracy and flatness of the product.

It is contemplated to apply closed regulation systems to rolling mill trains for round products as well. From EP 0 800 43 156 A 2, it has become known to use a shadow measuring system including three measuring systems disposed under different angles. The measuring systems are pivoted in their positions in order to measure the diameter from varying directions.

The known apparatus and the process for measuring the diameter and out-of-roundness furnish imprecisely measured values if so-called "orbiform-curved" contours occur. "Orbiform-curved" contours distinguish themselves by their property of being equal or approximately equal in their diameter values if their diameters are measured from different angles. Thus, their shadows also are equal in width. This missing difference or, at the most, this small difference between the largest and smallest diameters makes one believe that the workpiece being measured is of a very small out-of-roundness. This one, however, may actually prove to range far outside the admissible tolerances and requires to be reliably recognized by a measuring system.

It is the object of the invention to provide an apparatus and process for measuring the diameter and out-of-roundness, which allows of a quick and reliable measurement on workpieces by using a simple means.

BRIEF SUMMARY OF THE INVENTION

The apparatus has three or more laser triangulation devices. The triangulation measures the distance of the workpiece surface from the triangulation device. Measurement is effected in a joint plane which is perpendicular to the longitudinal direction of the workpiece so that all triangulation devices perform a measurement along the circumference of the workpiece. In addition, the laser triangulation devices are arranged at angular spacings which are substantially equal two by two. This angle will be about 120° if three laser triangulation devices are used whereas it will be reduced to 90° and 72° if four and five laser triangulation devices are used, respectively. The laser triangulation devices are directed in such a way that their laser beams will meet at a common point of intersection. The common point of laser beam intersection corresponds to the workpiece centre during the measuring operation. The direction of the laser triangulation devices helps achieve that each laser triangulation device not only measures any distance between the surface and the triangulation device, but that the radius of the workpiece may be associated with this distance value along the laser beam direction. Measuring the radius of the workpiece at three or more points makes it possible to recognize the out-of-roundness of the workpiece quickly and reliably even in case of "orbiform-curved" contours.

In an advantageous aspect of the apparatus, six laser triangulation devices are provided which enclose an angle of 60° two by two. Generally, it is a fact that the number of measuring points increases with an increase in the number of triangulation devices and, thus, both the accuracy and speed of measurement is improved.

In order to achieve more measuring points at a given number of laser triangulation devices the laser triangulation devices are designed to be rotated about their point of intersection in the plane spanned by the laser beams. Thus, pivoting the laser triangulation devices enables the workpiece to be measured from different directions. The pivoting range is advantageously limited to the angular distance between the triangulation devices so that if the number of triangulation devices increases the pivoting range will decrease, and so will the speed in measuring, which is an advantage particularly for rapidly advanced workpieces.

The inventive apparatus has three or more laser scanners. Each laser scanner has a light-sensitive sensor with a laser which is directed thereto for illumination in the sensor area. The laser beams of the laser scanner are arranged around the workpiece in a triangle or polygon for sensing the workpiece tangentially. For example, if the apparatus has three laser scanners their laser beams form a triangle which is arranged around the workpiece. The triangle is dimensioned here in such a way that the workpiece partly hides the illuminated areas of the sensors. Thus, a workpiece outer edge casts a shadow onto the sensor where the shadow permits to determine the outer edge extending farthest into the laser beam. The advantage of this apparatus is that the position of the workpiece is arbitrary to a large extent. As long as the workpiece is arranged within the triangle and casts a shadow onto all sensors the position of the workpiece centre is arbitrary.

In another advantageous aspect of the invention, the three laser scanners are arranged in such a way that they span an equiangular triangle around the workpiece. Using three laser scanners also makes it possible here to recognize "orbiform-curved" contours quickly and reliably by using few measured values.

In a further advantageous aspect of the invention, each laser scanner has associated therewith a zero relative to which the distance of the workpiece outer edge extending farthest into the laser beam is measured with the laser scanners being disposed in such a way that their zeroes coincide in one point. Because of this arrangement of the laser scanners, each laser scanner measures the distance of the shadow-producing workpiece outer edge from a zero. If this zero coincides with the workpiece centre the distance determined from the shadow corresponds to the workpiece radius in the point of contact of the straight line.

In order to take different measured points as simply as possible the laser scanners are rotatably supported about the common zero.

In a further advantageous aspect of the invention, the workpiece is illuminated by the laser beam of the laser scanner in such a way that the workpiece casts a shadow which completely is within the illuminated sensor area. As compared to the above-described apparatus, one laser scanner determines two parallel straight lines here which reflect the maximal distance between two workpiece outer edges on opposed sides. The arrangement involving three or more laser scanners at angular distances which are approximately equal, i.e. 120°, 90°, 72°, etc., forms three or more pairs of parallel straight lines which contact the workpiece. These straight lines make it possible to determine the diameter and out-of-roundness of the workpiece independently of the location of its centre. A displacement of the centre may be established by a calculation forming a difference from the data measured.

In a further advantageous aspect of the invention, this one is rotatably disposed in the plane spanned by the laser beams.

In a further advantageous aspect of the invention, it uses laser triangulation devices, which are directed to the workpiece in such a way that measuring the surface furnishes the workpiece radius in the point of contact.

The second measuring process is performed by using 3 or more laser scanners wherein one or two straight lines bearing on the outer edge, which extend in parallel with the laser beam, i.e. in the laser beam direction, are determined for each laser scanner from the shadow of the workpiece in a first process step. The appearance of one or two workpiece shadow edges on the sensor is dependent on whether the laser scanner merely illuminates the workpiece tangentially or illuminates the sensor so completely across a width that the workpiece casts a full shadow within the illuminated sensor area. In a second process step, an evaluation device computes a circle, which bears on the straight line as a tangent line, from three determined straight lines each. In the process steps which succeed here, the measuring operation to cpmoute the circle is repeated several times and the diameter and out-of-roundness of the workpiece is determined from the circle diameters measured.

In a further advantageous aspect of the process, the laser scanners are turned around the workpiece when the measurement is repeated. Thus, a major number of measured values is produced which allow to determine the out-of-roundness better within a short time.

Preferably, the measurement by the laser scanners is performed in a synchronized manner in response to a trigger signal. The synchronous measurement ensures that a radial motion of the workpiece during the measurement does not lead to any falsification of the results measured.

In a further advantageous aspect of the invention, the laser scanners measure the workpiece at most varied times and the evaluation device determines a motion vector for the workpiece from the times and the respective values measured. Since the evaluation device is capable of considering both the values measured and the time thereof it is possible to recognize and compensate a motion of the workpiece between the measuring operations.

In an appropriate aspect of the process, if more than three non-parallel straight lines have been determined, all triplets of straight lines are used for a calculation of the circle. If the number of straight lines is adequate it will also be possible to reconstruct a section of the surface contour with the aid of a computer so that it is possible to precisely determine the local out-of-roundness.

BRIEF DESCRIPTION OF THE SEVERAL VIEWS OF THE DRAWINGS

Three preferred embodiments of the inventive apparatus will now be explained in detail with reference to the Figures below.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
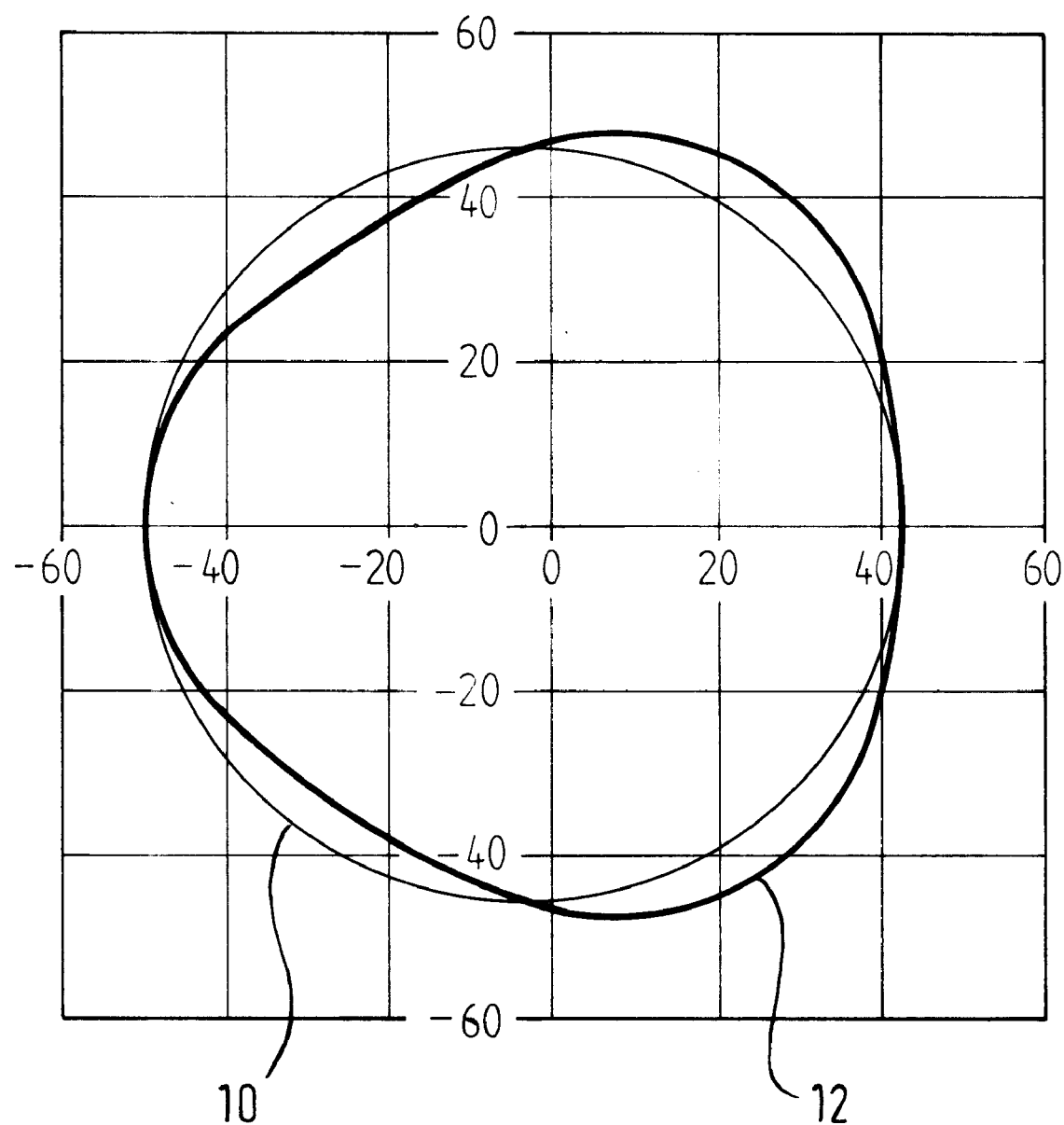
FIG. 1 shows the comparison between a third-order orbiform-curved contour object and a circle which is of the same diameter.

Referring to FIG. 1, a third-order orbiform-curved contour object 12 is shown. A comparison to the circle 10 makes it apparent that the orbiform-curved contour object 12, at any point, is of a diameter which corresponds to the circle diameter. Nevertheless, the orbiform-curved contour object 12 is of an out-of-roundness which can be outside admissible process tolerances of a production line. Theoretically, $2n+1^{th}$ order orbiform-curved contour objects may occur where n=0, 1, 2, . . . In the production processes which presently are used, if 3 rolls are employed, third-order orbiform-curved contour objects will preponderantly occur the way measurrement of which will be explained below.

Figure 2:
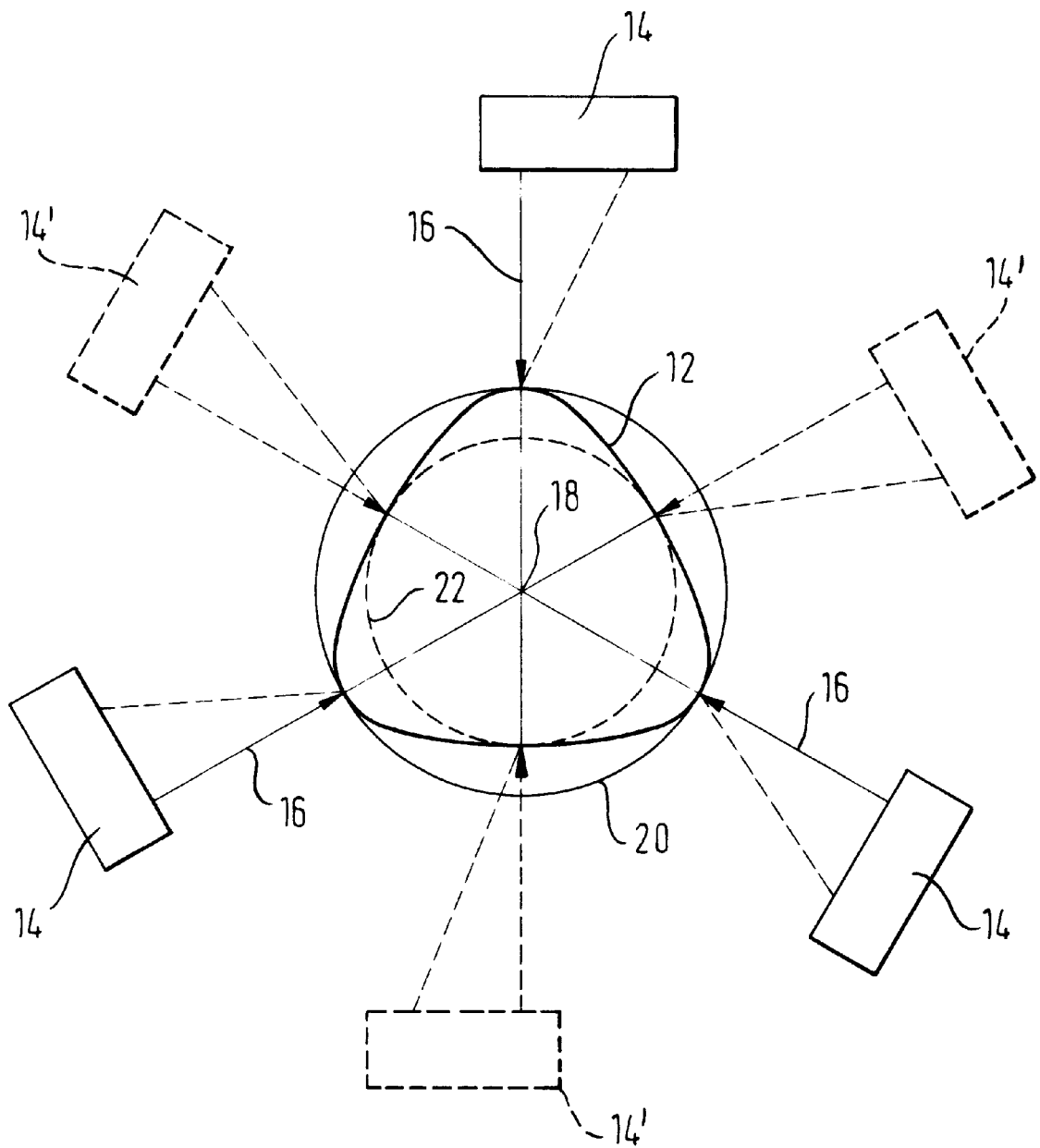
FIG. 2 shows how to measure an orbiform-curved contour object using three triangulation sensors.

The apparatus for measuring the orbiform-curved contour object 12, which is schematically shown in FIG. 2, has three triangulation sensors 14. The sensors are arranged around the orbiform-curved contour object 12 and are directed in such a way that their laser beams 16 enclose an angle of 120°. The laser beams 16 intersect at a point 18 which constitutes the centre of the orbiform-curved contour 12 at the same time. In the position shown for the orbiform-curved contour object 12 in FIG. 2, the measurement of the distance of the centre 18 from the surface of the orbiform-curved contour object 12 always gives the same value. Using this value as a radius it is possible to determine the circumcircle 20 of the orbiform-curved contour object.

In the position drawn in phantom lines for the triangulation sensors 14', these measure the minimal radius of the orbiform-curved contour object, which leads to a determination of the inscribed circle 22. If the triangulation sensors 14' are rotated to the position designated by 14' the radius of the circle measured will decrease continuously. If the angular position of the maxima or minima of the orbiform-curved contour object 12 is not known at least 4 3-point measurements which are uniformly distributed under the circumference are required to obtain adequate accuracy in determining the out-of-roundness. Starting from this number of measurements, the smallest and largest diameters may be reliably determined.

An initial adjustment of the triangulation sensors makes it sure that all of the three laser beams 16 intersect at the centre. Further, using precision cylinders during adjustment will ensure that this centre is the common zero for all of the three sensors. The object under investigation has to be in the zero of this radial arrangement. Each of the sensors involved now measures the radius and transmits it to an evaluation computer, which computes the respective circle. Then, more partial diameters are determined by rotating the object or rotating the measuring device about the object. The measurement is completed after a rotation through 120° and the evaluation computer now determines both the smallest and largest diameters and the out-of-roundness, as a difference therefrom.

In order to limit the angle of rotation and, hence, the duration of measurement the measuring device may be extended by more measuring head triplets, the offset of which always is 120° from each other, in such a way that they will again cause uniform offset angles altogether of all sensors from each other.

Figure 3:
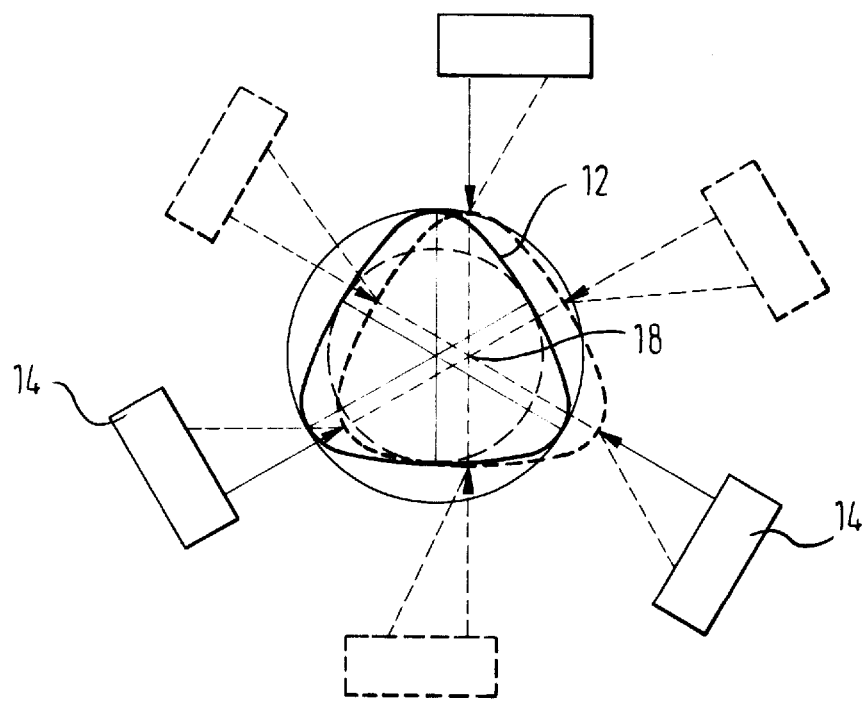
FIG. 3 shows how to perform measurements using triangulation sensors on an out-of-centre object.

The measured values which occur if the orbiform-curved contour object 12 is displaced with respect to the centre 18 are schematically shown in FIG. 3. The evaluation unit associated with the measuring device is adapted to recognize the appearance of such an error of measurement for the orbiform-curved contour object shown by the fact that no common radii are found in the measurements made by the triangulation sensors. Preferably, such error of measurement is recognized in a rotatable measuring assembly.

Figure 4:
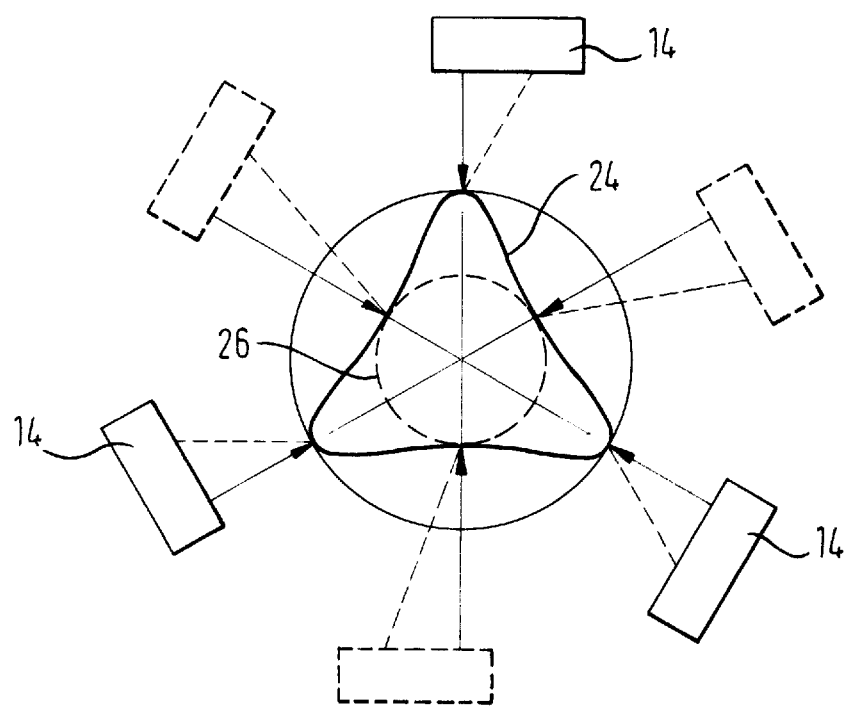
FIG. 4 shows how to measure the orbiform-curved contour object with concave sides using triangulation measurement.

FIG. 4 shows how to measure a third-order orbiform-curved contour object 24 with concave sides. The concave sides are measured by means of the triangulation sensors 14 in a reliable manner because their laser beams 16 are directed to the centre of the orbiform-curved contour object 24. Thus, the inner circle 26 thus determined corresponds to the actually existing inner radius.

Figure 5:
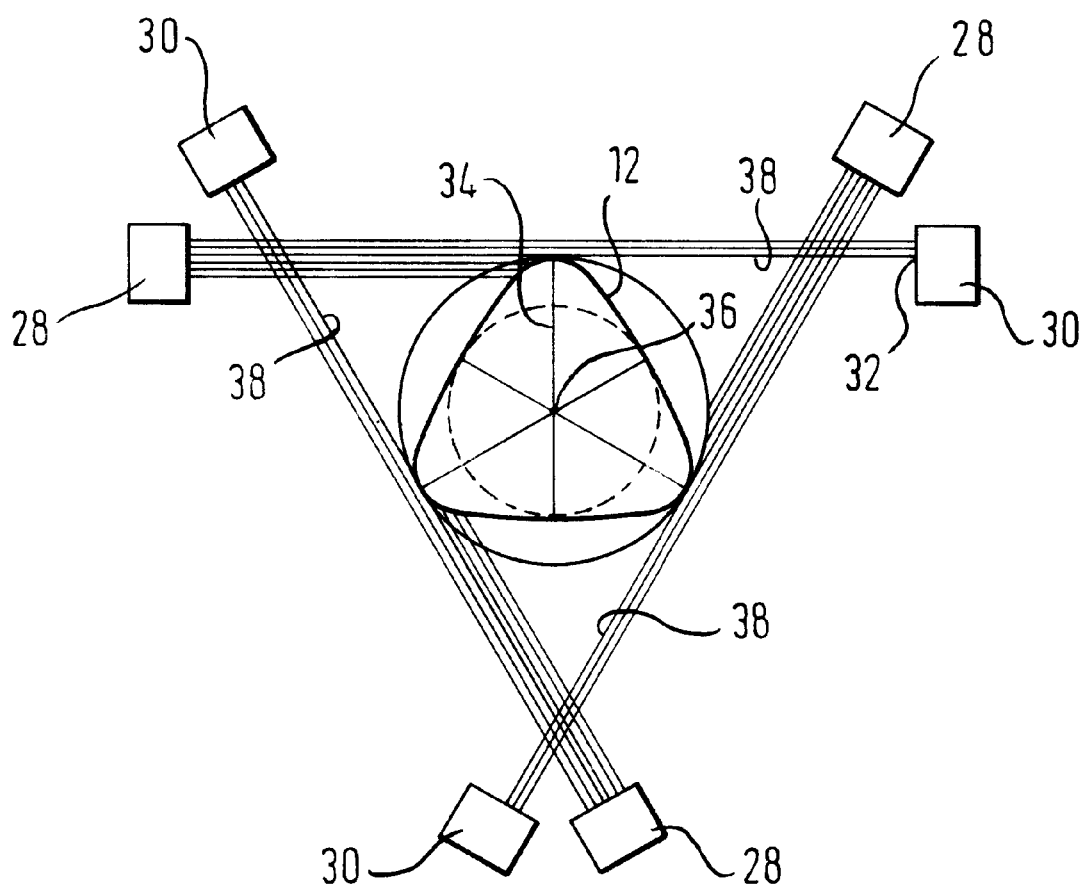
FIG. 5 shows how to perform measurements of an orbiform-curved contour object using laser scanning micrometer gauges while it undergoes sensing by three tangents.

FIG. 5 shows an apparatus comprised of three laser scanners 28, 30 which are arranged so as to form a triangle around an orbiform-curved contour object 12. In the embodiment shown, the laser 28 is configured as a line laser and projects a line onto the associated sensor 30. The laser scanners are arranged around the orbiform-curved contour object 12 such that this one partially hides the laser beams with a view to casting a shadow edge 32 onto the sensors. Each of the three sensors 30 now measures the distance 34 of the object outer edge from the zero 36. A common evaluation computer reads in these three measured values. Because of the tangential illumination of the object, however, there is no information on the sensing location along the respective laser beam in contrast to the case of using triangulation sensors. The respective circle is computed as that circle which tangentially conforms to the straight lines 38 extending in parallel with the laser beam.

Since the angles of the straight lines 38 are known with respect to each other these indications on the three tangent lines make it possible to clearly determine the circle therefrom.

If the angular position of the orbiform-curved contour object is unknown the laser scanners may be rotated around it.

Figure 6:
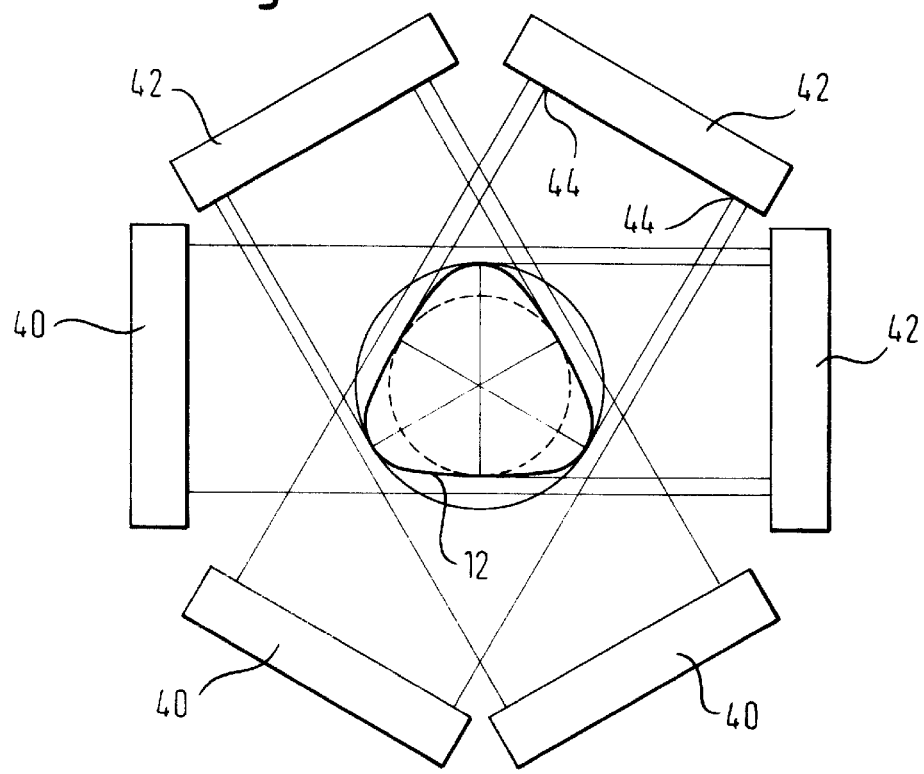
FIG. 6 shows how to measure a convex orbiform-curved contour object using laser scanning micrometer gauges while it undergoes sensing by six tangents.
Figure 7:
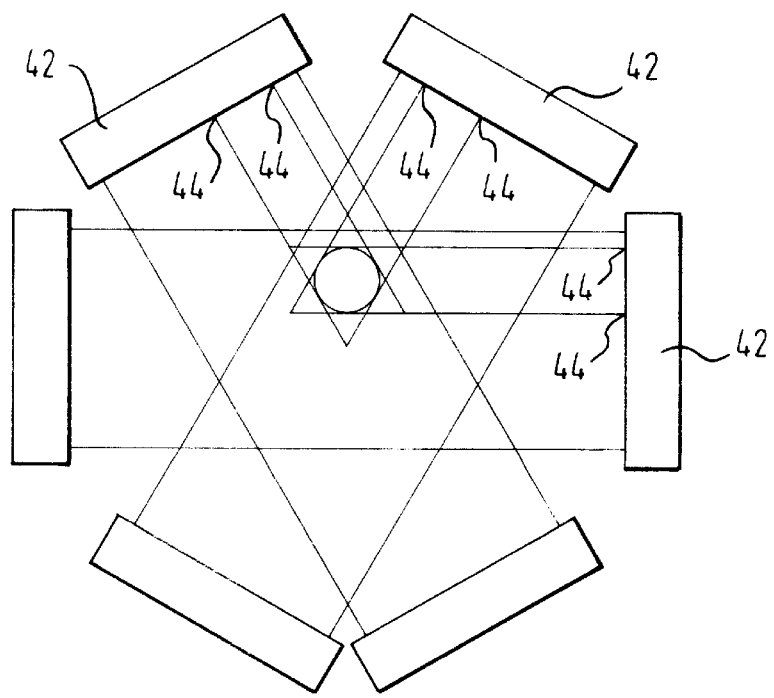
FIG. 7 shows the apparatus of FIG. 6 on an out-of-centre workpiece.

The apparatus illustrated in FIGS. 6 and 7 is comprised of three laser scanners 40, 42 which are arranged around the orbiform-curved contour object at a uniform angular spacing. The laser scanners have a laser 40 the laser beam of which is displaced in parallel through the measuring field at a rapid sequence while illuminating a wide range on the sensor 42. The orbiform-curved contour object 12 casts two shadow edges 44 onto the sensor 42. As can be seen particularly well from FIG. 7 the apparatus creates a total of six shadow edges together with the associated straight lines which bear on the orbiform-curved contour object 12 being measured. It is unnecessary to adjust the laser scanners with respect to the workpiece being measured as long as the workpiece is completely within the optical field of each laser scanner. In this process, however, it is impossible to correctly determine the minimal radius for an orbiform-curved contour object having inwardly domed, concave sides.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An apparatus for measuring the diameter and out-of-roundness of elongate workpieces advanced in their longitudinal direction in rolling mill trains, including three or more laser scanners, each of which has a light-sensitive sensor and a laser which is directed thereto for the illumination of a sensor area, and, wherein an evaluation device calculates a straight line bearing on an outer edge of the workpiece, which extends in parallel with the laser beam, from a shadow edge which the workpiece casts onto the sensor of the laser scanner, and a circle on which three straight lines bear as tangent lines, and from a plurality of circles an out-of-roundness of the workpiece as the difference between the largest and smallest diameter of the circles.

2. The apparatus according to claim 1 wherein three laser scanners are provided which enclose an angle of 120°.

3. The apparatus according to claim 1 or 2 characterized in that each laser scanner has associated therewith a zero relative to which the distance (34) of the workpiece outer edge extending farthest into the laser beam is measured.

4. The apparatus according to claim 3, wherein the laser scanners are rotatably supported about their common zero.

5. A process for measuring the diameter and out-of-roundness of elongate workpieces advanced in their longitudinal direction in rolling mill trains, with a measuring device comprised of three or more laser scanners each of which having a light-sensitive sensor and a laser which is directed for illuminating a sensor, comprising the process steps below:

illuminating the workpiece such that each of the lasers casts one or two shadow edges onto each of the sensors, calculating a straight line, bearing on the outer edge of the workpiece for each laser scanner, which extends in parallel with the laser beam, from the shadow edge (38,44) which the workpiece casts onto the sensor of the laser scanner, calculating, with an evaluation device, a circle on which three of the straight lines bear as tangent lines, repeating several times the measurement made for the calculation of a circle using the three straight line calculation, and the out-of-roundness of the workpiece is determined from the circle diameters measured as the difference between largest and smallest diameter.

6. The process according to claim 5 wherein the measuring devices are rotated around the workpiece while the measurements are repeated.

7. The process according to claim 5 wherein the measurement is performed by the measuring apparatus in a synchronized manner in response to a trigger signal.

8. The process according to claim 5 wherein measuring apparatus performs measurements at different times and an evaluation device determines a workpiece motion vector from several measurements.

9. The process according to claim 5 wherein if more than three non-parallel straight lines are measured all of the triplets of straight lines are used for the calculation of tangent lines.

* * * * *